United States Patent [19]

Leach et al.

[11] Patent Number: 5,120,913
[45] Date of Patent: Jun. 9, 1992

[54] TORQUE LIMITED DRAWOUT MECHANISM FOR CIRCUIT DEVICE

[75] Inventors: Thomas C. Leach, Cedar Rapids; James B. MacBeth, Danville, both of Iowa

[73] Assignee: Square D Company, Palatine, Ill.

[21] Appl. No.: 661,567

[22] Filed: Feb. 25, 1991

[51] Int. Cl.⁵ .................. H01H 9/20; H01H 33/46
[52] U.S. Cl. .................. 200/50 AA; 361/391; 464/37
[58] Field of Search .................. 200/50 AA, 50 A; 74/525; 464/35, 37, 38, 39; 361/391, 338, 339, 343

[56] References Cited

U.S. PATENT DOCUMENTS

| | | | |
|---|---|---|---|
| 3,157,258 | 11/1964 | Cronholm | 464/37 |
| 4,417,650 | 11/1983 | Geisthoff | 464/37 |
| 4,693,132 | 9/1987 | Buxton et al. | 464/39 |
| 4,792,321 | 12/1988 | Lundquist | 464/35 |

*Primary Examiner*—Harold Broome
*Attorney, Agent, or Firm*—Jose W. Jimenez; Nicholas A. Camasto

[57] ABSTRACT

A circuit breaker drawout arrangement includes a drive mechanism for moving a circuit breaker along a pair of rails between a Connect and a Disconnect position by means of a drive tool. A torque limited clutch permits a lower maximum torque when moving the breaker to the Connect position and a greater maximum torque when moving from the Connect position to the Disconnect position. In one embodiment the clutch is formed by a pair of oppositely orientated unidirectional roller clutches in the drive nut and in another by a ball and detent arrangement in the drive nut.

11 Claims, 3 Drawing Sheets

TORQUE LIMITED DRAWOUT MECHANISM FOR CIRCUIT DEVICE

CROSS-REFERENCE TO RELATED APPLICATIONS

This application is related to U.S. patent application Ser. No. 661,024, entitled CIRCUIT DEVICE RACKING MECHANISM, and U.S. patent application Ser. No. 661,032, entitled CHARGING SYSTEM FOR A CIRCUIT BREAKER, all filed on the same date and all assigned to Square D Company.

BACKGROUND OF THE INVENTION AND PRIOR ART

This invention relates generally to a racking or drawout mechanism for a circuit breaker, fuse truck, fused circuit breaker (hereinafter sometimes collectively referred to as "circuit device") and particularly to a two-way clutching system for a racking circuit device in and out. While the invention is described in connection with a circuit breaker, it is understood not to be so limited.

U.S. Pat. No. 4,693,132, issued Sept. 15, 1987, entitled Drive Mechanism For Drawout High Amperage Multi-Pole Circuit Breaker and U.S. Pat. No. 4,728,757, issued Mar. 1, 1988, entitled Interlock Scheme For Drawout High Amperage Multi-Pole Circuit Breaker, both in the names of Clifford A. Buxton, David C. Higgins and Gary A. Volesky and both assigned to Square D Company, respectively disclose a clutched arrangement for limiting the maximum torque applied when moving a circuit breaker between Disconnect and Connect positions to prevent damage to the breaker mechanism and an interlock for preventing access to or operation of the breaker under certain circumstances.

The present invention is a further improvement on the clutched drive mechanism of the '132 patent. It is also readily capable of providing a greater torque when removing the circuit device than when installing the circuit device. The benefit of this aspect of the invention is that while the torque during installation of the circuit device is restricted (as before), a larger torque is available during removal. Often a circuit device may be more difficult to draw out than it is to install due to a variety of causes including operational variations in the clutch mechanism. The invention assures that, whatever the reason for the difficulty, the circuit breaker or circuit device can be removed, which eliminates the need for working on a live circuit or for shutting down the circuit feeding the circuit device.

SUMMARY OF THE INVENTION

In accordance with the invention, a two-way clutching arrangement, in which torque in one direction is limited to a first level while torque in the opposite direction is limited to a second, higher level, is coupled between the drawout tool and the circuit device drive mechanism. One embodiment has two oppositely oriented unidirectional roller clutches and the other a spring loaded ball and detent arrangement. Either version may be conveniently included in the drive nut that is used to move the circuit device in and out.

OBJECTS OF THE INVENTION

A principal object of the invention is to provide a novel drawout mechanism for a circuit device.

Another object of the invention is to provide a drawout mechanism for a circuit device that assures that the device will be removable.

A further object of the invention is to provide a novel two-way clutched drive for a drawout mechanism.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENTS

Figure 1:
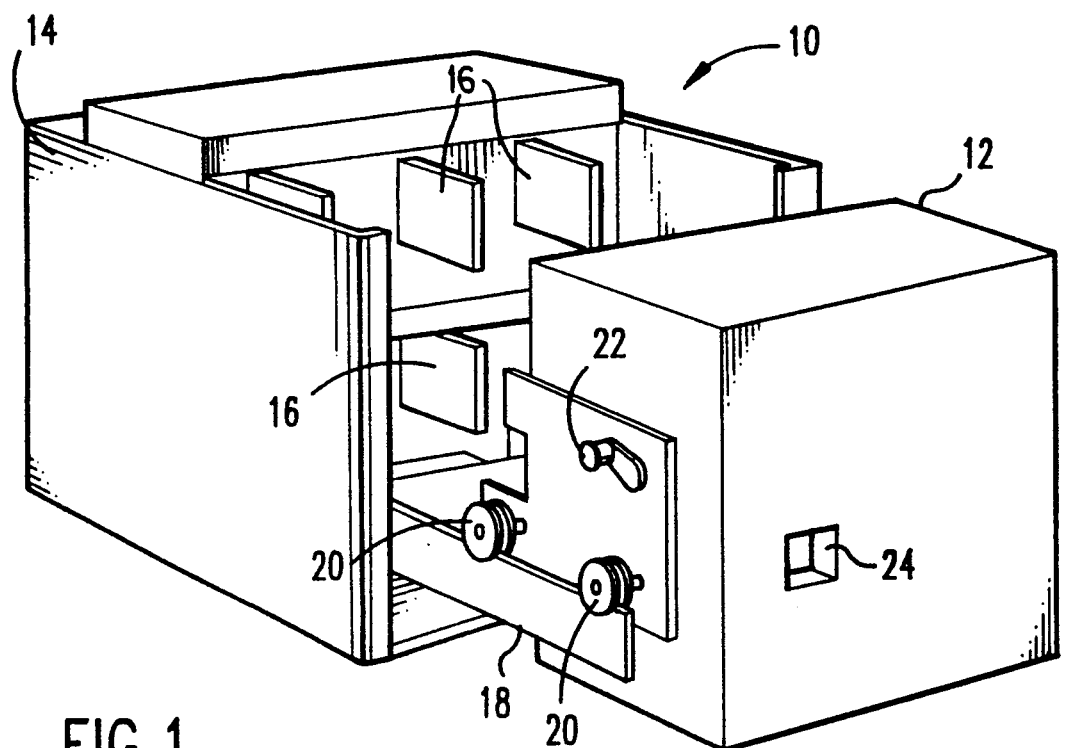
FIG. 1 is a perspective view of a prior art circuit breaker and drawout mechanism.
Figure 2:
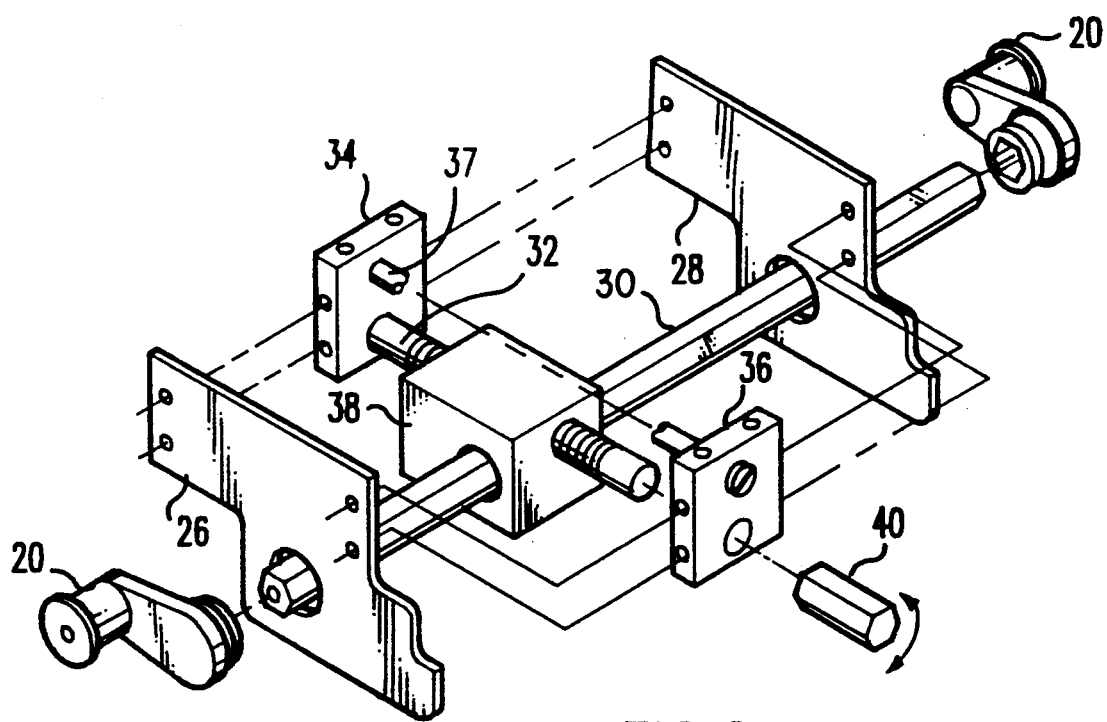
FIG. 2 is an exploded partial view of the drive arrangement for the racking mechanism of FIG. 1.

Referring to FIG. 1, a high amperage circuit breaker and drawout mechanism 10 is shown. A circuit breaker 12 (or circuit device) is conventionally mounted for movement into and out of a cabinet or cubicle 14 for connection to a plurality of power conductors (not shown) that connect to an electrical power distribution arrangement (not shown). A plurality of electrical contacts 16 are arranged to make contact with mating contact mechanisms (not shown) on circuit breaker 12. Circuit breaker 12 is mounted on a pair of pullout rails 18 by means of rollers 20. A pair of levering arms 22 (one on each side of the breaker) engage cradle mechanisms (not shown) for securing breaker 12 to cabinet 14 and to permit moving the breaker among Disconnect, Test, Connect and Remove positions. The corresponding structure for accomplishing the above is fully disclosed in the above-mentioned patents and also in the copending applications above-mentioned and form no part of the present invention. When the breaker 12 is in the Connect position (e.g. it is installed), electrical contact is made between contacts 16 and the power conductors. In the position shown in FIG. 1, circuit breaker 12 is in the Remove position and may physically be lifted off of rails 18. The Disconnect position of the circuit breaker is where the breaker has been pushed into cabinet 14 a distance sufficient for levering arms 22 to engage the mechanism (not shown) in cabinet 14 for commencing the racking procedure. As is well known, there is often difficulty encountered in moving the circuit breaker 12 into full engagement with terminals 16. A window 24 in the front of the breaker is provided for enabling a tool such as a ratchet wrench to be inserted for engaging a drive nut to drive the circuit breaker drive mechanism to move the breaker among its various positions. This is best illustrated in FIG. 2.

The levering arms 22 engage a shaft 30 that passes through a pair of sideplates 26 and 28 on breaker 12. A drive screw 32 is supported for rotation in a pair of end plates 34 and 36 that are secured to the side plates 26 and 28. A support screw 37 secures end plates 34 and 36 together to withstand the large forces exerted thereon by drive screw 32. The drive mechanism may be conventional with a worm gear, but is preferably constructed in accordance with above-mentioned copending U.S. patent application Ser. No. 661,024 conventional embodiment, shaft 32 engages a worm gear drive 38 (not shown) that converts rotational movement of the drive screw 32 into rotation movement of levering arms 20 and resultant linear movement of circuit breaker 12 along rails 18. The drive screw 32 is moved clockwise or counterclockwise by means of a drive nut 40 and suitable tool (not shown).

Figure 3:
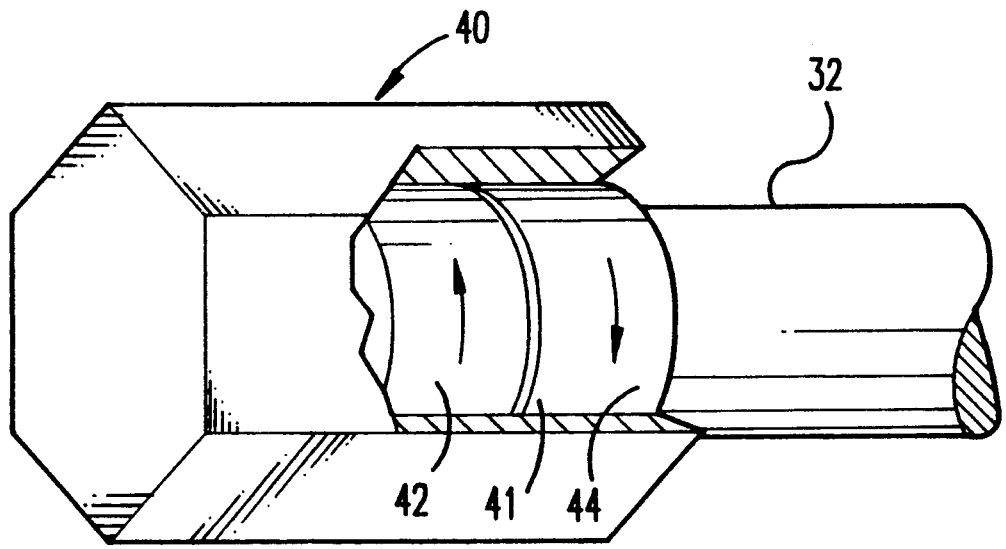
FIG. 3 is a partial cutaway view of one form of a two-way clutch mechanism of the invention.

One embodiment of a two-way clutch of the invention is disclosed in FIG. 3. It consists of a pair of oppositely orientated unidirectional roller clutches 42 and 44 that couple drive screw 32 to the cylindrical inner surface 41 of drive nut 40. The roller clutches are of the drawn cup type and are available in different maximum torque ratings from Torrington under the model designation type DC. The roller clutches have no inner races and their outer races are secured, by any well known means, to the inner surface 41 of drive nut 40. The "inner race" is provided by the surface of drive screw 32 (which is smooth, of course). The roller clutches "slip" at their rated torque level for one direction of rotation and freely rotate for the other direction of rotation. Slipping is actually caused by deformation of the surface of drive shaft 32 and hence the clutches only survive a single operation. Yet, their operation is sufficient to prevent costly damage to the circuit breaker or circuit device being installed. As indicated by the arrows, the drive or torque direction is different for each of the roller clutches 42 and 44 with roller clutch 42 permitting a limited torque driving relationship for counterclockwise rotation of drive nut 40 and roller clutch 44 permitting a limited torque driving relationship for clockwise rotation of drive nut 40. As will be seen with reference to FIGS. 5 and 6, selecting a torque load for roller clutch 44 that is lower than the torque load for roller clutch 42, a higher torque is provided for moving the breaker from the Connect to the Disconnect position than for moving the breaker from the Disconnect to the Connect position. Specifically, the racking in torque is less than the racking out torque which assures that the circuit breaker or circuit device will be removable (by the drive nut) under nearly all situations.

Figure 4:
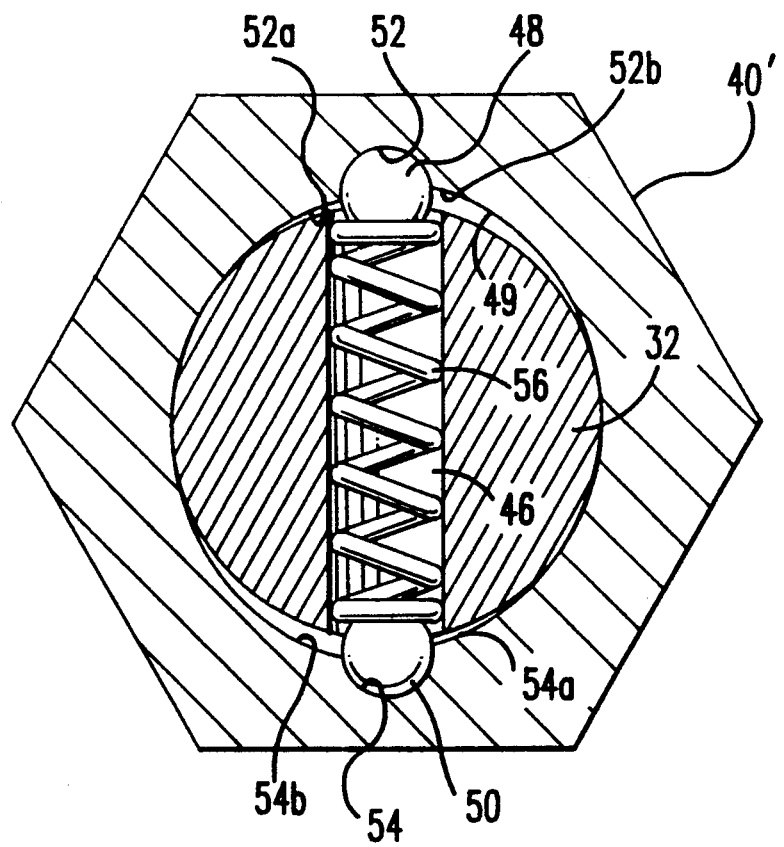
FIG. 4 is a sectional view illustrating a preferred form of a two-way clutching mechanism in accordance with the invention.

In FIG. 4 a different, and presently preferred, clutch embodiment is shown. In this arrangement, a cylindrical aperture 46 is formed at the end of drive screw 32 for use in a spring loaded ball and detent arrangement. A compression spring 56 is positioned in aperture 46 and has ball bearing 52 positioned at each end. A generally cylindrical inner surface 49 is formed in a drive nut 40' of a diameter slightly larger than the diameter of drive screw 32. A pair of diametrically opposed detents 52 and 54 are formed in inner surface 49 for engagement with ball bearings 48 and 50. The different limiting torques are obtained by providing ramps or shoulders 52a and 52b of differing slope or heights on opposite sides of recess 52 for ball 48 and similar ramps or shoulders 54a and 54b on opposite sides of recess 54 for ball 50. As should be apparent, for a clockwise movement of drive nut 40', a drive shaft 32 is driven until a force is reached at which compression spring 56 permits balls 50 and 52 to be withdrawn and ride up shoulders 52b and 54b. Thereafter the clutch slips and drive nut 40' spins on drive screw 32. In the reverse direction the shoulders 52a and 54a determine the limiting torque which, as can be readily observed, is much higher since the shoulders 52a and 54a are much higher than their counterparts 52b and 54b. Consequently, a higher limiting torque is provided for clockwise rotation of drive nut 40' than for counterclockwise rotation. Specifically much more force can be applied, before the clutch slips, when removing the circuit breaker than can be applied when installing the circuit breaker. The drive nut 40' may be captured on the end of drive screw 32 by any conventional means such as a C ring.

Figure 5:
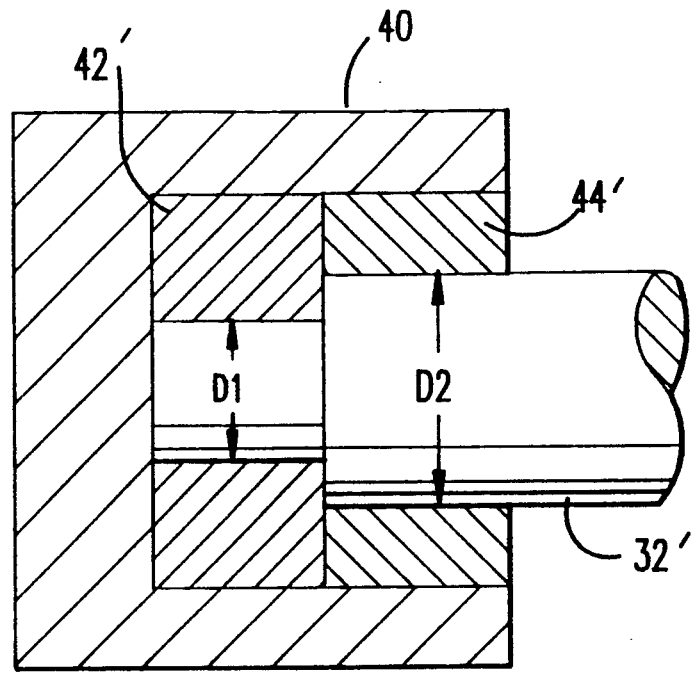
FIG. 5 is a partial sectional view of one version of the mechanism of FIG. 3.
Figure 6:
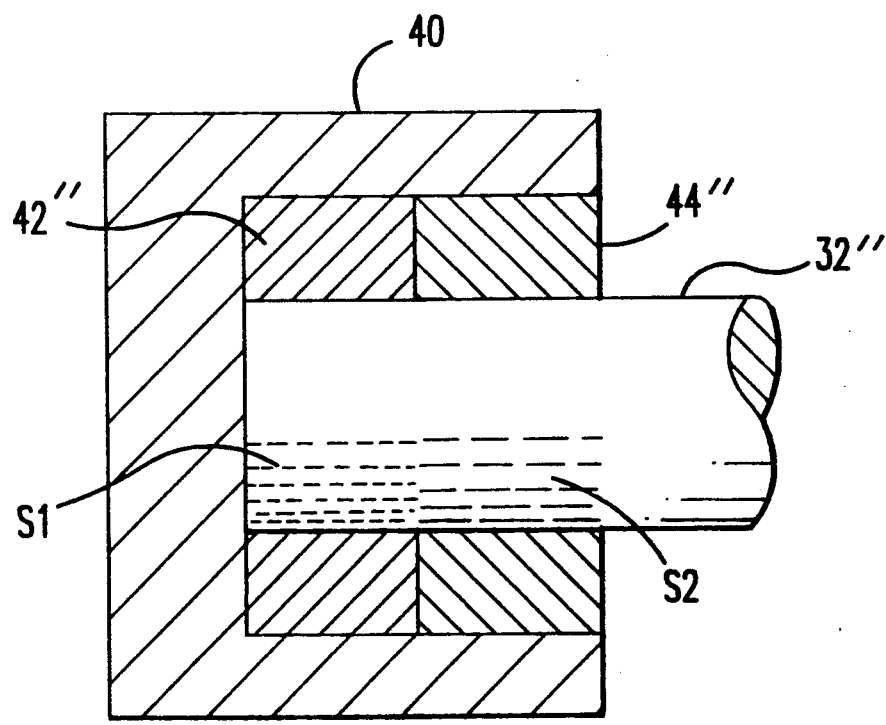
FIG. 6 is a partial sectional view of another version of the mechanism of FIG. 3.

Differing torques can be obtained with the roller clutches of FIG. 3 by the techniques illustrated in FIGS. 5 and 6. The roller clutches are indicated by cross-hatched lines for convenience and simplicity and are standard off-the-shelf items. In FIG. 5 two different diameters D1 and D2 are formed on the end portion of a drive screw 32'. With D2 greater than D1, the torque limit of roller clutch 44' will be greater than the torque limit of roller clutch 42'. Here again the roller clutches operate by deforming the surface of shaft 32' and are one-time devices.

In FIG. 6, a different technique is used in that areas S1 and S2 on the surface of the end of a drive screw 32" are formed with differing hardness. With the surface S2 being harder than the surface S1, greater torque will be possible with roller clutch 44" than with roller clutch 42".

It is recognized that numerous changes and modifications in the described embodiments of the invention will be apparent to those skilled in the art without departing from its true spirit and scope. The invention is to be limited only as it defined in the claims.

What is claimed is:

1. A drawout mechanism for a circuit device comprising:
   rail means supporting said circuit device in a first position;
   means for horizontally moving said circuit device along said rail means;
   drive shaft means for driving said moving means with a tool to move said circuit device to a second position; and
   torque limiting means coupled to said drive shaft means for permitting different maximum torque forces to be applied to said drive shaft means depending upon the direction of movement of said circuit device along said rail means.

2. The mechanism of claim 1 wherein said circuit device has a Connect and a Disconnect position, said torque limiting means includes a drive nut coupled to said drive shaft means through a bi-directional torque mechanism, said mechanism slipping at a first torque for rotation moving said circuit device to said Connect position and at a second higher torque for rotation moving said circuit device to said Disconnect position.

3. The mechanism of claim 2 wherein said bi-directional torque mechanism comprises a pair of roller bearing torque clutches arranged to slip in opposite rotational directions, said pair of torque clutches being concentric with said drive shaft and being secured to said drive nut.

4. The mechanism of claim 2 wherein said bi-directional torque mechanism comprises a spring loaded ball and a detent formed in the interior of said drive nut, said detent including a pair of ramps of differing characteristics straddling said ball.

5. A two-way clutch for controlling the force applied to a circuit device for moving it along the rails of a drawout mechanism between a Connect and a Disconnect position, comprising;

first means for supplying a first resistance to movement of said circuit device for movement from said Disconnect position to said Connect position;

second means for supplying a second higher resistance to movement of said circuit device for movement from said Connect position to said Disconnect position; and drive means for applying movement forces to said circuit device.

6. The clutch of claim 5 further including a drive shaft and a drive nut and wherein said first and said second means comprise;

a pair of oppositely oriented unidirectional roller clutches having different torque limiting characteristics coupling said drive shaft to said drive nut.

7. The clutch of claim 5 further including a drive shaft and a drive nut, and wherein said first and second means comprise:

an inner surface in said drive nut permitting rotation of said drive shaft therein;

a pair of spring loaded balls mounted in said drive shaft engaging said inner surface; and a pair of detents for said balls formed in said inner surface, said detents being characterized by a steeper ramp on one side than on the other.

8. The clutch of claim 6, wherein said roller clutches use the surface of said drive shaft as an inner race and wherein said drive shaft has a stepped diameter for imparting said different torque limiting characteristics to said roller clutches.

9. The clutch of claim 6, wherein said roller clutches use the surface of said drive shaft as an inner race and wherein said surface has sections of different hardness for imparting said different torque limiting characteristics to said roller clutches.

10. A drawout mechanism for a circuit device or the like comprising:

rail means supporting said circuit device in a first position;

means for horizontally moving said circuit device along said rail means;

drive shaft means for driving said moving means with a tool to move said circuit device to a second position; and drive nut means coupled to said drive shaft means, including torque limiting means housed in said drive nut means for limiting the maximum torque force applied to said drive shaft means, said torque limiting means exhibiting a first maximum torque for movement of said circuit device from said first position to said second position and a second, higher macimum torque, for movement of said circuit device from said second position to said first position.

11. The mechanism of claim 10 wherein said torque limiting means comprises a pair of roller bearing torque clutches arranged to slip on said shaft in opposite rotational directions, said pair of torque clutches being concentric with said drive shaft and being secured within said drive nut means.

* * * * *